US011734739B2

(12) United States Patent
Harvey (10) Patent No.: US 11,734,739 B2
(45) Date of Patent: *Aug. 22, 2023

(54) METHODS FOR SAMPLE PRESENTATION USING AUTONOMOUS VEHICLES (71) Applicant: Thomas Danaher Harvey, Rockville, MD (US)

(72) Inventor: Thomas Danaher Harvey, Rockville, MD (US)

(*) Notice: Subject to any disclaimer, the term of this patent is extended or adjusted under 35 U.S.C. 154(b) by 119 days.

This patent is subject to a terminal disclaimer.

(21) Appl. No.: 17/174,387

(22) Filed: Feb. 12, 2021

(65) Prior Publication Data
US 2021/0174418 A1 Jun. 10, 2021

Related U.S. Application Data (60) Division of application No. 16/297,600, filed on Mar. 9, 2019, now abandoned, which is a continuation of application No. 15/431,818, filed on Feb. 14, 2017, now Pat. No. 10,275,815.

(51) Int. Cl.
G06Q 30/00 (2023.01)
G06Q 30/0601 (2023.01)
G05D 1/00 (2006.01)
G09F 21/04 (2006.01)
G09F 27/00 (2006.01)

(52) U.S. Cl.
CPC ....... G06Q 30/0617 (2013.01); G05D 1/0088 (2013.01); G09F 21/04 (2013.01); G09F 27/00 (2013.01); G05D 2201/0207 (2013.01)

(58) Field of Classification Search
CPC ............ G06Q 30/0617; G05D 1/0088; G05D 2201/0207; G06F 21/04; G06F 27/00

USPC ................................................ 705/26.1–27.2
See application file for complete search history.

(56) References Cited

U.S. PATENT DOCUMENTS 9,378,607 B1* 6/2016 Wine ................. G06Q 30/0281
2008/0005012 A1* 1/2008 Deneef ................. G06Q 30/00
705/37

OTHER PUBLICATIONS

SBS. Technological Disruption and Innovation in Last-Mile Delivery—White Paper; Stanford Business School, Stanford University: Stanford, CA, USA, 2016. (Year: 2016).*

* cited by examiner

Primary Examiner — Anand Loharikar (57) ABSTRACT

A method and a system to present samples of products to customers by transporting the samples to the customer's location with an autonomous vehicle. The sample can be a product, a component of a product, a material or a device to gather information in defining the product. The autonomous vehicle is adapted for off road travel and may enter buildings, it can be carried to a nearby location by a street adapted vehicle. Information may be transmitted electronically but physical presence is essential. The customer or the customer's agent receives a presentation of the product definer and a selection of a final product is made. In other cases the autonomous vehicle delivery separate or installed technical equipment to examine the presentation location and assist in the final product selection. For example, photographs from multiple locations can measure a room for installation of carpets or draperies, etc.

10 Claims, 9 Drawing Sheets

METHODS FOR SAMPLE PRESENTATION USING AUTONOMOUS VEHICLES

CROSS REFERENCE TO RELATED APPLICATIONS

This application is a division of application Ser. No. 16/297,600 filed Mar. 9, 2019 now pending which is a continuation of application Ser. No. 15/431,818 filed Feb. 14, 2017 now U.S. Pat. No. 10,275,815. Each patent application identified above is hereby incorporated by reference in its entirety.

STATEMENT REGARDING FEDERALLY SPONSORED RESEARCH OR DEVELOPMENT

Not Applicable

BACKGROUND OF THE INVENTION

Field of the Present Invention

The present invention relates to a method selling goods or services by presenting samples at a customer's location and taking orders with a customer access combining a conventional vehicle on the public roads and an autonomous vehicle for final customer access.

Background Concerning the Need for the Current Invention

Products are widely sold one or the other of two broad methods; either selection from catalogs, internet pages or other descriptive information systems or by allowing a customer to inspect the products or related samples at a seller's location. Both of these methods have limitations.

Catalogs and on-line presentations can only describe the product in words and pictures and are limited in the way they can deliver the experience of the product. They cannot show the feel of a product or allow the customer to test the product. The customer is limited by the capabilities of the communication means employed.

Physical "brick and mortar" stores can give a much fuller presentation by showing the customer the actual product, samples or other physical presentation aids, but they require the customer to travel to the seller's location. The time and expense for this can be very limiting because customers are busy and may choose to visit a competitor on the basis of convenience.

The ideal situation for selling is to present products or samples to a potential customer at the customers preferred location which is typically inside the customer's home or office. A salesperson can bring the samples and make an in-person call, but that is too expensive in many cases. Only by presenting a product by means of an autonomous vehicle adapted to access interior spaces can products be shown and demonstrated inexpensively in many cases.

BRIEF SUMMARY OF THE INVENTION

The current invention includes a method of selection products by first selecting a group of products on the basis of demand and a location to present samples or objects to assist in defining a specific product. This selection can be on the basis of a communication from the customer or may be made on the basis of other information. The samples or objects are used to select a particular product from the class of products. The samples or objects are transported to the customer's location by an autonomous vehicle and presented to the customer to enable the selection. The samples or physical product definers are useful because they can carry information that is not suitable for virtual delivery.

The presentation location can be inside a building where a street vehicle is not suitable. The presentation can be directly to a customer or can consist of using the product definer to gather information from the presentation location. In many cases the customer examines the product definer by sight or touch.

The invention includes a system for accomplishing the method which has the combination of an autonomous vehicle, a physical product definer

BRIEF DESCRIPTION OF THE SEVERAL VIEWS OF THE DRAWING

The features and advantages of the various embodiments disclosed herein will be better understood with respect to the drawing in which.

DETAILED DESCRIPTION OF THE INVENTION AND EMBODIMENTS

Definitions

The definitions in this section apply throughout the specification and in the claims Where definitions in common or in dictionary use are contrary to these definitions, the definitions here apply. Where definitions in common or dictionary use are consistent with these definitions, the definitions here supplement the common or dictionary definitions.

A product is a unit of the quid pro quo of an actual or potential sales transaction. It may include goods or services or subscriptions to goods or services.

A product definer is a physical object presented to define the nature of a product. It may be a product itself, a material or a component of a product, a model of a product or component. It may also be a device to gather information or to make a measurement, comparison or test to define a product. While product definer is defined to be limited to a physical object, may involve information components that are displayed or otherwise used in conjunction with physical object. For example, a video display which brought to the presentation may constitute the product definer but may function by presenting information to the customer.

The term sample is used in this specification in the broader sense of a product definer and is not limited to a product or a part or a portion of a product. The two terms are used interchangeably but always have the broader sense unless otherwise explicitly stated.

Presentation of a product definer means making the product definer includes operation of a product definer which is a device to facilitate definition of the product.

A vehicle is a device that can travel from one location to another under its own power and under autonomous, remote or driver control.

A road vehicle which herein is also called a first vehicle is a vehicle which can travel on public roads. It may come from a depot which stores product definers or it may already be loaded with product definers or autonomous second vehicles which have product definers. It may be a human driven, a remotely operated or an autonomous vehicle.

A autonomous vehicle is a vehicle which is enabled to travel without a human driver. It may depend on communication links for information or computing assistance from outside of the vehicle for part of its operation.

A autonomous second vehicle is a vehicle which can carry a product definer from a transfer point reached by a road vehicle to a location which is not accessible by a public road network.

The term seller includes agents and representatives of parties selling products. It also includes parties who seek to promote products in the interest of product sellers.

The term customer is synonymous with buyer and includes those who actually or potentially wish to acquire products from sellers.

Products

Products include both goods and services. They are to be chosen by the customer from the class of products to which a product definer applies. For the sake of illustration, consider a seller who sells paint and floor tile with each one in red or in brown colors. This defines four products—red paint, brown paint, red floor tile and yellow floor tile. The seller may also provide two service products—painting walls and tiling floors which here would be sold and priced by the square foot. I.E. in the example 1 square foot of painting is a unit of a product.

Classes of Products

A class of products for the purposes of the methods described here is a group of products that would allow sellection by a particular product definer or group of product definers. For the products above two classes of products might be paint which is selected on the basis of a book of color chips and floor tile which is selected on the basis of a set of sample tiles. The service products might be another class of products for this seller with a measuring device to estimate square footage as a product definer.

Product Definers

The function of a product definer is to allow the customer to make a choice from a class of products. This would, hopefully from the viewpoint of a seller, lead to the ordering of products. A product definer for the various embodiments is a physical object. This is because the embodiments described herein comprise methods of physically transporting the product definers to the customer for inspection. Mere information in itself is not considered here because it can be delivered without the need for transportation of a physical object; but if a physical device is required to receive or interpret the information to inform a customer's decision then the device becomes a product definer.

In various embodiments the product definers can take different forms. A product definer may be an actual product that can be retained by the customer. This would be appropriate when a customer requires testing the performance or operation of the product to make a buying decision. In other embodiments the product definer may be an actual product which, however, is not retained by the customer. There would be a way for the customer to examine the product by sight, hearing, touch for other senses or test means. The customer might even be able to connect to an electronic product to test compatibility with the customer own equipment or other products held by the customer.

In many embodiments the product definer may not be an entire product but a part of a product or a sample of a material to be incorporated into a product. Similarly, a model of a product which would enable a customer to handle and view from all sides a representation of a product too large to be actually brought for examination. It might for example be a model of a building yet to be built.

In another group of embodiments the product definer may not be an actual product, but comprises materials, devices or representations that enable the customer to make a buying decision. As one example, the product definer may be a set of gauges to determine the size of an engagement ring. A customer may want to get the size and order the ring when the time is ripe and the engagement partner is present and willing to accept a proposal. In another embodiment, product definers of fabrics in which a garment could be provided are presented for examination by the customer.

In some embodiments the product definer may be custom produced for the customer. For example, the customer may provide information such a color and a set of initials and the product definer may be samples of handkerchiefs with the customer's own initials embroidered on them. This could be effective in selling either larger lots of handkerchiefs or other larger embroidered items. In a commercial context advertising items such a pens with engraved logos by justify samples showing the actual intended item with the final logo.

Presenting Product Definers

The customer may be allowed to remove a product definer for examination from the second vehicle and may or may not be required to replace the product definer on the second vehicle. The product definer may be protected by a variety of means. This includes encasement in a transparent box or other enclosure, attachment by a tether, attaching the product definer to the structure or the definition vehicle or other means to insure the product definer is not removed. If the product definer is removable than means such as determining the weight of product definers or the presence of product definers in specific receptacles can be used to ensure that all product definers are returned before departure of the second vehicle.

In many embodiments the product definer presentation may consist of allowing the customer to look at or handle a product definer. In other cases, the product definer may perform an active role in allowing a customer to select a service or product. An example of an active role is to have the product definer consist of ring gages for measuring a person's finger(s) for determining a ring size. There are many other uses for measuring devices. These include delivering as a product definer a laser measuring device which records measurements taken by the customer for items such as curtains or furniture to be installed. The measuring device may be a recording device to gather pictures, audio samples or sensor data to define the product or service.

In some embodiments the customer may not be present. There may be a person who represents the customer and accepts the product definer. Another person may use the product definer to perform actions such as measuring. Or there may be no person present at all and the product definer may be left or used to perform some task relevant to product definition. Two examples of the latter are a product definer which makes unattended measurements or one which connects via a local network to devices only accessible by local access over a system such as Wi-Fi.

Throughout this specification and in the claims, presentation is defined to include the case where a product definer interacts with persons or objects located at the presentation location and gathers information to be used to select a product.

In some embodiments a representative of the seller may be present when the presentation occurs. The product definer by be shown to the customer by the representative or used by the representative to perform an action relative to the selection of a product.

Virtual Presentation and Acquisition

The term virtual presentation or acquisition as used in this specification and associated claims means transferring information that does not require the presence at the presentation location of the physical product definer. The usefulness of a physical product definer is to allow the use of information that cannot conveniently be transmitted electronically to the presentation location and received by equipment already there. If the physical product definer displays or uses information transmitted electronically to or from the presentation location, but the information cannot be displayed or utilized without the resources of the physical product definer, this does not constitute virtual product presentation or acquisition Vehicles Operable on Public Roads A vehicle operable on public roads serves as the first vehicle and takes the product definer to a transfer point. This vehicle of this system operates on the public road system or on private roads and ways which are designed for such vehicles. The public road system is highly regulated in both the roads themselves and in the vehicles that are permitted to operate on them.

Restrictions on road vehicles include size minimums which are currently designed for human operated vehicles and intended to prevent use of toy vehicles on roads. As autonomous vehicles become common additional standards will be adopted for them and are likely to have much more detailed minimum size requirements. One reason for this is that vehicles likely not to be seen by other drivers would be considered dangerous.

The size and design of vehicles is also limited by requirements for lighting.

It is currently unknown the extent of usage of autonomous vehicles on public roads that will be allowed as the technology of such vehicles advances. Vehicles operated on public roads are required to have specific licenses from the various states before they may legally be driven on the roads.

Vehicles operated on public roads must have speed capabilities and performance to keep up with traffic.

Vehicle for Access to Location not Accessible by Public Roads

The second leg of the transportation process for a product definer is from the transfer point to the location for presentation. The vehicle for this leg is to be autonomous and can function off of the public roads. A typical embodiment would have the first vehicle stop in a parking area or on the public road near the customer's home. The second autonomous vehicle would travel in areas not suitable for the first vehicle such as walks, stairs, apartment halls or elevators. The vehicle would be adapted for that purpose as well as to the needs of carrying and presenting the product definer(s).

The vehicle which performs the final access segment is an autonomous or driverless vehicle. This means a vehicle which operates under the control of non-human processing equipment. It includes all vehicles other than those controlled by humans whether the human drive is on or with the vehicle or is operating the vehicle by a remote connection.

In some embodiments the autonomous vehicle may operate in an open loop manner from instructions or an internal map without changes from information delivered during the operation from sensors or other environmental information sources.

The autonomous vehicle may update the information in the movement plan or internal map by receiving information gathered by sources outside the vehicle or it may gather information from sensors associated with the vehicle. Regardless of the source of new information the updating of the plan or map may be continuous or in an incremental process.

Information which is supplied to the autonomous secondary delivery vehicle by the delivery recipient or the location controller is described below.

Autonomous vehicles have numerous advantages over human operated vehicles, especially over vehicles which carry humans. Among these is the smaller size, often much smaller. Avoidance of the need for safety measures to protect an operator although protective measures for other persons and property remain. The cost of a human operator is high. Even if a human is needed to dispatch, load or monitor vehicles, it is often the case that one person can handle a number of autonomous vehicles. It may be undesirable to have a human operator, even one working remotely, approach a final delivery point. This may be for safety, security or other reasons.

In some embodiments the autonomous vehicle may incorporate equipment to perform additional operations while delivering the parcel. For example, the product definer may be a specialized item which can be installed by the delivering equipment. An example of the would be an analyzer which would be installed to monitor details of the power usage at the presentation location and which would recommend products or services to increase efficiency.

Location for Presentation

The initial communication from the customer will have defined a location for the presentation. In most embodiments, the location would be a place more convenient to the customer than any place directly accessible by a public road network. There can be other reasons for having a location away from the public roads such as security. E.G. it might not be safe to show samples consisting of extremely valuable diamonds on the street. Other reasons for an off-street location include the necessity of accessing customer property to use the product definer. An example of this is where the product definer consists of measuring equipment laser measuring devices that are built into the second vehicle and used select products to be installed into the real estate. The location might also be a place where an activity to supported by the product selection is performed. One example is a vehicle which comes up to the table in a restaurant, sizes a finger for a ring and displays ring samples. One hopes that the immediacy of the presentation brings success to a proposal of marriage.

Location Not Accessible by Public Road Network

Most locations for presentation as requested in the first communication are not completely accessible by vehicles on the public roads There are numerous reasons that a presentation location cannot be accessed by a public road vehicle. For example, there may be narrow paths which are not designed to allow larger vehicles. There may be non-vehicle doors to be passed. There may be stairs to be climbed. Safety requirements may prevent driving road vehicles in certain areas. The final delivery point may be inside a building and accessible by an elevator. All of these situations occur in the various embodiments of the current described invention.

The inaccessibility of the presentation location to road vehicles may be physical in nature as in the narrow paths, stairs or elevators above. In other cases, the inaccessibility may be imposed administratively for non-physical reasons such as security, safety or even to maintain decorum.

Administrative inaccessibility can also come from the need to perform operations or deliver services other that the actual bringing of the product definer to be presented in conjunction with the delivery. Examples include security inspections which may be impractical with road vehicles, delays which would hold up a primary delivery vehicle from making other deliveries, handling restrictions depending on the nature of the product definer which may be large or require special handling and many other special situations.

Receiving First Communication from Customer

A customer wanting to learn about goods or services can communicate with a seller. This can be done by phone, by an online application or by another means. One advantage of the methods envisioned is that the customer can start and complete the process of making an informed choice and ordering a service or product without going to a particular location or to the seller. The only requirement for the customer is for access by the definition vehicle.

The customer in requesting product definers explicitly or implicitly specifies the type of product definer(s) wanted. An example of doing this directly is to state "send me sample set B." A less direct specification could be "send me samples that fit a 26 inch ladies bicycle." An example of an implicit product definer specification would be a system that advertises "for curtain samples call (000) 000-1111, for bedspread samples call (000) 000-2222)" The choice of phone number implicitly defines the requested product definers.

In some embodiments a representative of the seller may be present with the customer and relying on information gathered from the customer call in the request. In that case there is a direct communication from the customer to the representative and an indirect communication from the customer through the representative.

Selecting Physical Product Definer

A seller having received a request for product definers has information about the specific product definers to send to be seen by the customer. This information can be from prior experience in sales, information about the customer such as identity or interests know to be associated with this customer or information given by the customer in the communication requesting product definers.

The seller selects product definers on the basis of this information and on the basis of other factors. These other factors can include the capacity of transporters; marketing, physical or display compatibility with other product definers; availability of product to fill orders; profitability of various products; image goals by seller; contractual obligations; and many more. The product definers may them be loaded on the autonomous vehicle or an autonomous vehicle may be selected as having appropriate product definers.

Transporting to Transfer Point

In embodiments where two vehicles are used to transport the product definer(s), the product definer(s) are taken to the transfer paint by one vehicle which may be one suitable for travel on public roads. In other embodiments, the first vehicle may be selected a being more economical than the autonomous vehicle used as the second vehicle. This economy may be because of its not be required to navigate the final leg of the journey or because the first vehicle can serve multiple deliveries.

Transporting to Location for Presentation

The vehicle making the final transportation to the location is an autonomous vehicle. This has several advantages. The cost of providing a human driver for each presentation is substantial and is saved by use of an autonomous vehicle. In many cases the final link of travel to the presentation location is not suitable for vehicles adapted for human drivers. This includes destinations reached by stairways, elevators, and narrow hallways etc. The adaptations of vehicles for these spaces are very different than the adaptations of vehicles for use on public roads.

Making the Presentation

In some embodiments the presentation may be made by a computer in or working through the autonomous vehicle. The product definer may be shown or otherwise presented to the customer at the location for presentation. The customer may have an input in the exact method of presentation or in further selection of product definers.

In another class of embodiments a human representative of the seller may be present at the presentation. This representative may communicate with the aid of the product definers and assist in making a product selection.

In still another class of embodiments there may be a person representing the seller who is not present at the presentation location but communicates over a video, audio or other communication link.

Selecting Particular Product

With the aid of the product definers the customer may select a particular product or group of products or indicate a preference among the variables presented. A selection can be by model, color, size, type or for some other variable in the availability of products. The seller then uses the customers selection of preference to select products for sale or for further presentation of negotiation.

DETAILED DESCRIPTION OF THE VIEWS OF THE DRAWING

Figure 1:
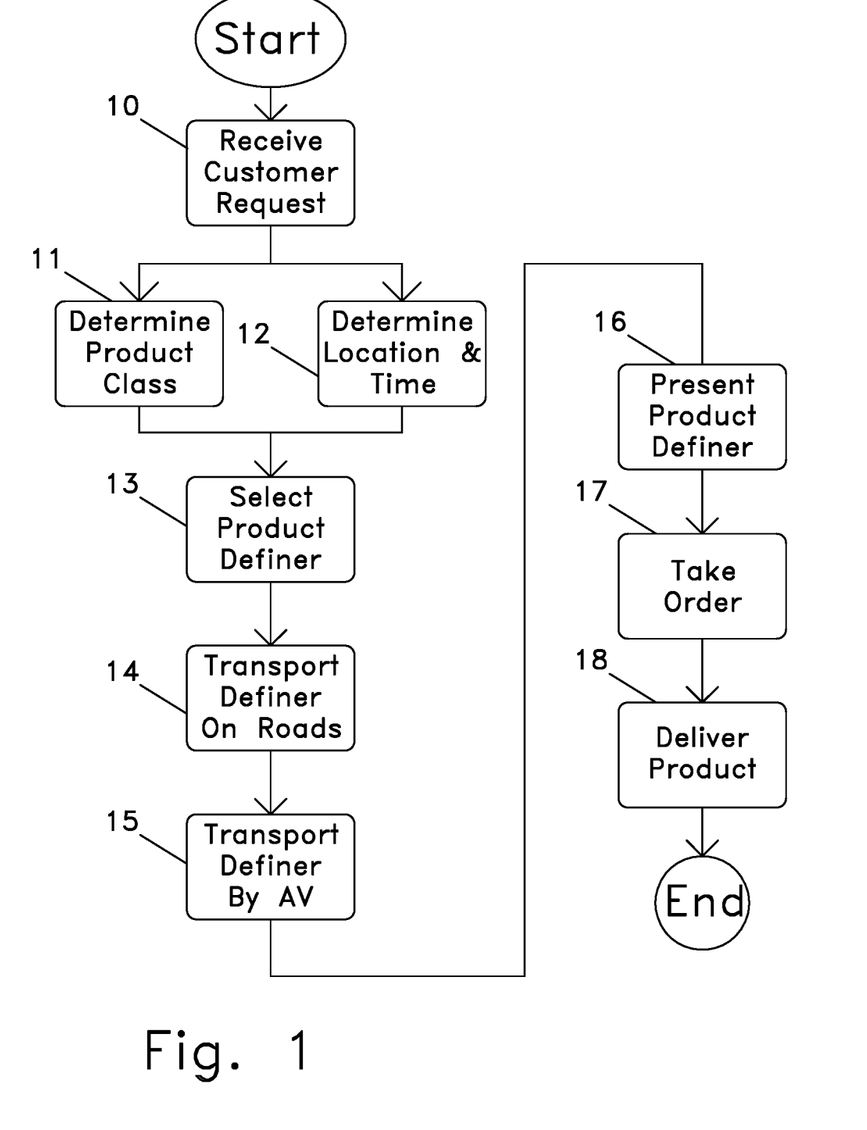
FIG. 1 is a diagram showing steps of the method of the current invention.

Referring to FIG. 1 a diagram of the steps of a typical embodiment of the current invention is shown. The steps begin by a seller having an availability for receiving customer inquiries about potential interest in seller products. The customer makes a request 10 to be able to examine a sample or other product definer. The seller collects two type of information to set up the presentation of the product definer. First the seller needs to know enough about the potential customer's interest to define a group or class of products to be presented 11 and the seller needs to know a location and time 12 to present the products. In order to facilitate sales this appointment will be at a time and place convenient to the customer. When this information is collected the seller agrees with the customer on the appointment. The seller then selects 13 appropriate product definers to present and prior to the appointed time transports 14 the product definer by road to a point near to the customer. The road vehicle doing the transporting in most cases transport the autonomous vehicle to make the final presentation. The product definer may be preloaded on the off road vehicle and the selection may actually be a selection of the second vehicle as one carrying appropriate product definers or the product definers may be loaded on the second vehicle before or at the transfer point. The second leg of the movement 15 is then made off of the public roads, for example into an apartment building if the appointment will occur in the customer's apartment. The product definer is presented 16 to the customer and the customer then or later communicates a product choice 17 to the seller who delivers 18 the product ending the process.

Figure 2:
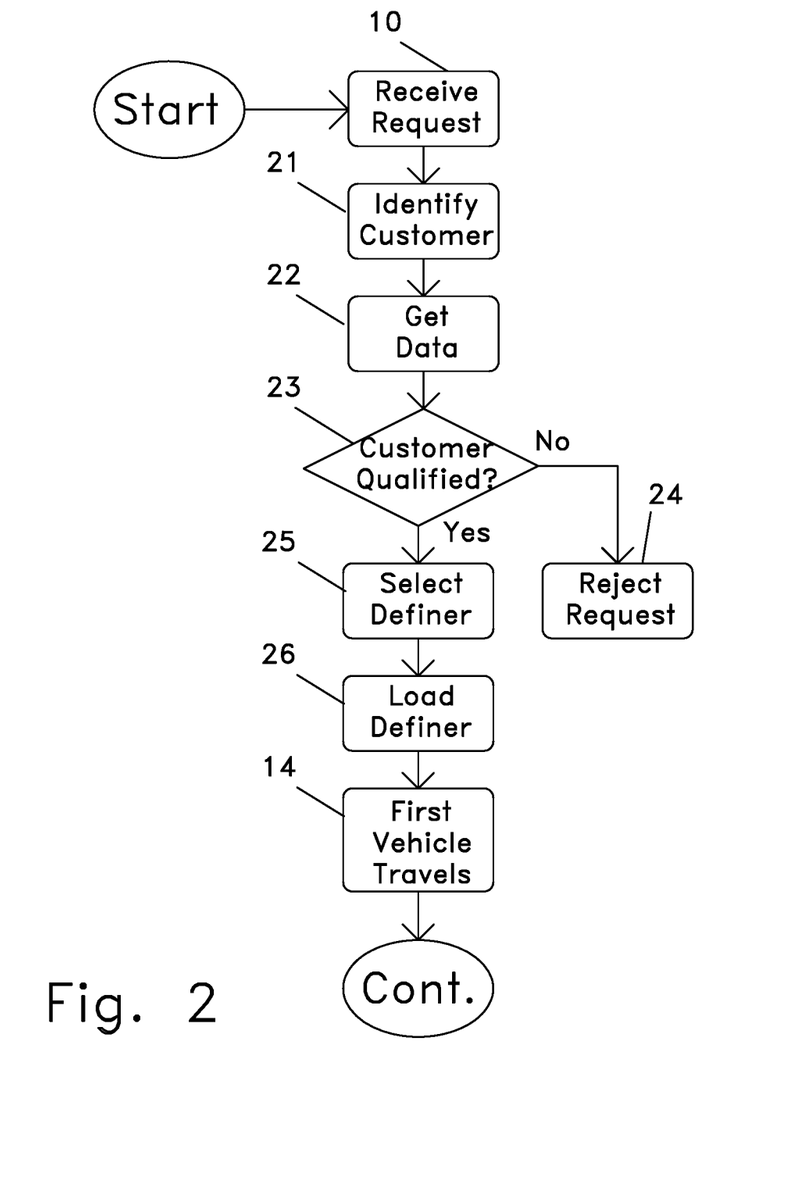
FIG. 2 is a more detailed diagram of the first steps of the method.

Referring to FIG. 2 details of the process of a typical embodiment are shown up to the dispatch of the first vehicle. A customer makes a request including the category of products which are of interest and the time and/or place for inspection of a product definer(s). The request is received 10 by the seller. The seller proforms functions which may include identifying 21 a known customer. The data necessary to make a decision for the process is then gathered 22. The seller in many cases then retrieves data about the customer from a known customer database. The customer supplies possibly in conjunction with data from the database for from outside sources the class of product and the presentation desired. A determination 23 is made about the customers qualification to receive receive the requested opportunity. The determination is made on the basis of factors which may include the relation to the time and location requested to the available product determiner and vehicle resources available. If the customer or the request is not qualified the request is politely declined 24. If the requested product definer inspection opportunity is to be accomplished, the seller 25 selects appropriate product definers (samples). A first vehicle is selected or loaded with the appropriate product definer(s) 26 and the first step of travel to the location via the public roads is begun 14.

Figure 3:
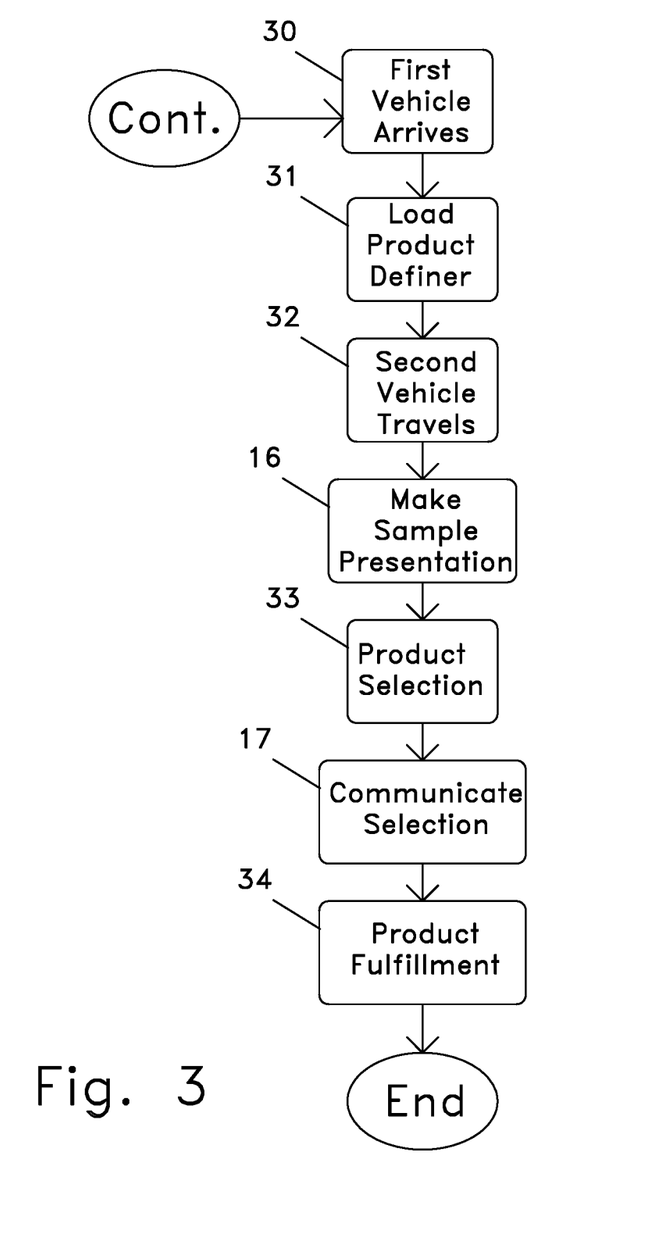
FIG. 3 is a more detailed diagram of the later steps of the method.

Referring to FIG. 3 details of the continuation of the process are diagrammed. The first vehicle arrives at the nearest or most convenient point accessible by public roads—the transfer point 30. If the autonomous second vehicle has not been loaded with the product definer(s), then the product definers are loaded onto the second vehicle 31. Because the first vehicle may have a driver, that driver or another person may do the loading or it by be done by locally or remotely controlled machines. The second vehicle travels autonomously 32 across the distance to the presentation location. This path crosses areas which are not suitable for road vehicles such as the first vehicle. The presentation is made 16 on one of the modes described above. The customer selects a product 33 and makes a communication 17 to register the selection with the seller. Then the product fulfillment is undertaken by the seller 34.

Figure 4:
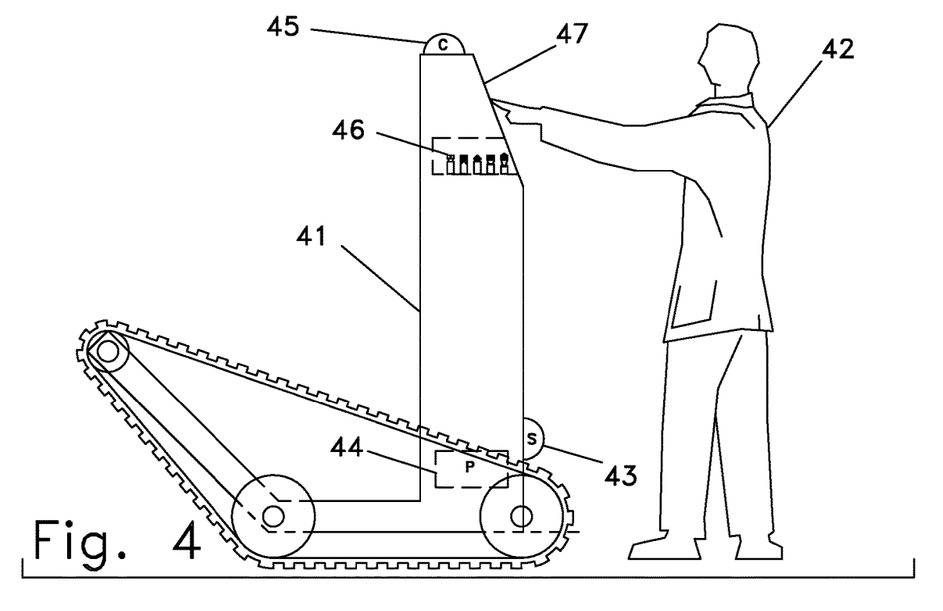
FIG. 4 is a view of an elevation of a vehicle carrying product definers and a customer.

Referring to FIG. 4 an autonomous second vehicle 41 of an embodiment is shown making a presentation to a customer 42. The vehicle is adapted to access the customer's front door coming from the street where it was brought by the first vehicle. It functions with the aid of power 44, sensory 43 and communication 45 units to travel under it's own power and guidance to the presentation location. It carries product definers 46 which are here depicted as chessmen. The customer examines the product definers and selects the one to be used in product fulfillment. The selection is make on a touch screen built into the vehicle 47, but the selection could also be made by means of an application on the customers cellphone or by another communication means.

Figure 5:
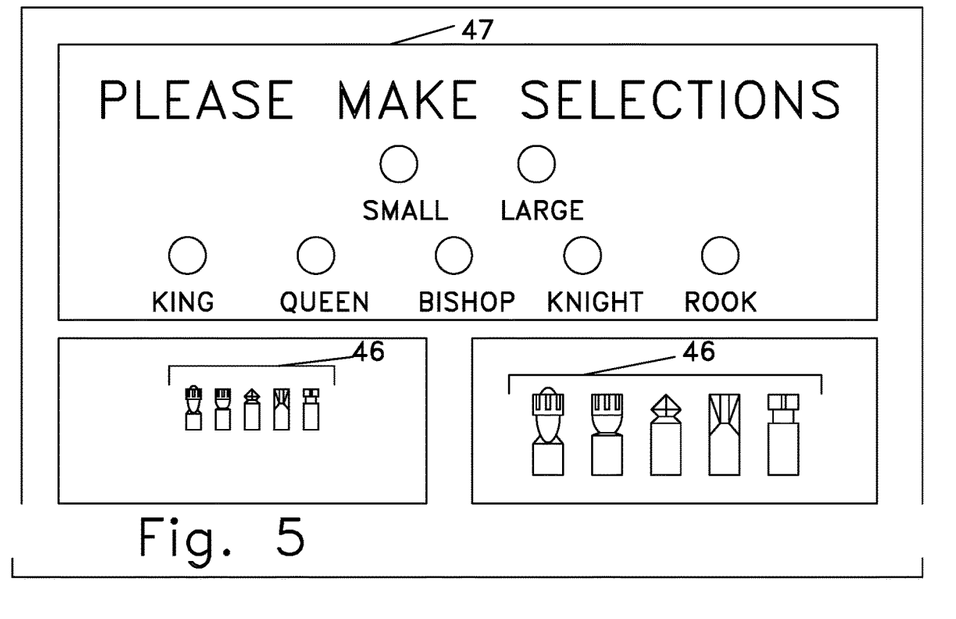
FIG. 5 is a view of a screen built into a vehicle to make selections from product definers.

Referring to FIG. 5, the touchscreen 47 of FIG. 4 is shown with product definers 46 displayed in openings below. The customer makes a selection by means of the touchscreen in the embodiment selected. Data processing and communication modules in the autonomous second vehicle make a communication to initiate fulfillment of the request developed on the touchscreen.

Figure 6:
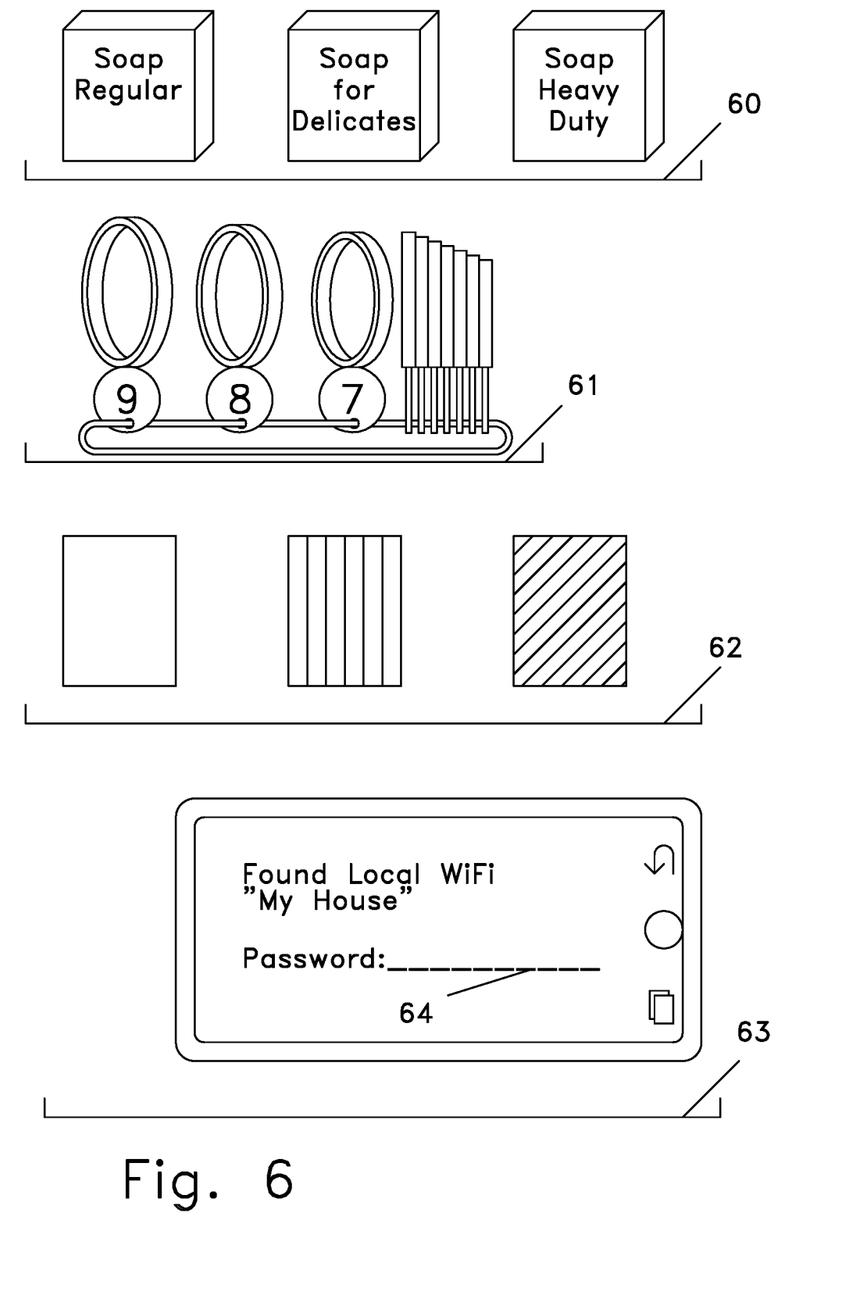
FIG. 6 is a view of typical product definers.

Referring to FIG. 6, several examples of product definers exemplifying different categories are shown. A product definer can be a sample of the product to be defined itself. In some cases a single product is presented to allow the customer to confirm its properties and to select that product over other possibilities form the same supplier or a competitor. A group of related products 60 is depicted. In this case the customer or buyer can choose one or more from the possibilities with the samples presented. Another type of product definer is a measuring device to be used to choose the selected product. A set of ring size gages 61 is shown which can be used to measure a finger and select the size to order a ring. The product definer may not be a product itself, but can be a piece of a material or finish used in the product. Several different finishes are shown 62 which allow selection of different colors, textures, materials or other surface details.

Another category of product definer is an electronic device 63 which connects to customer devices over a local network. Large area networks are often blocked from accessing smart devices for security reasons. A device which can log into a local network perhaps using the customer's local password 64 can then talk to the local smart devices and define products to work in conjunction with the local smart devices. Many types of information that can be obtained from the customer's smart devices would serve to define products fitted to the customer's needs. Examples of such information gathering would include determination of device models for ordering spare parts, determining contents of customer's smart refrigerator and counting the number of smart light bulbs at the location.

Figure 7:
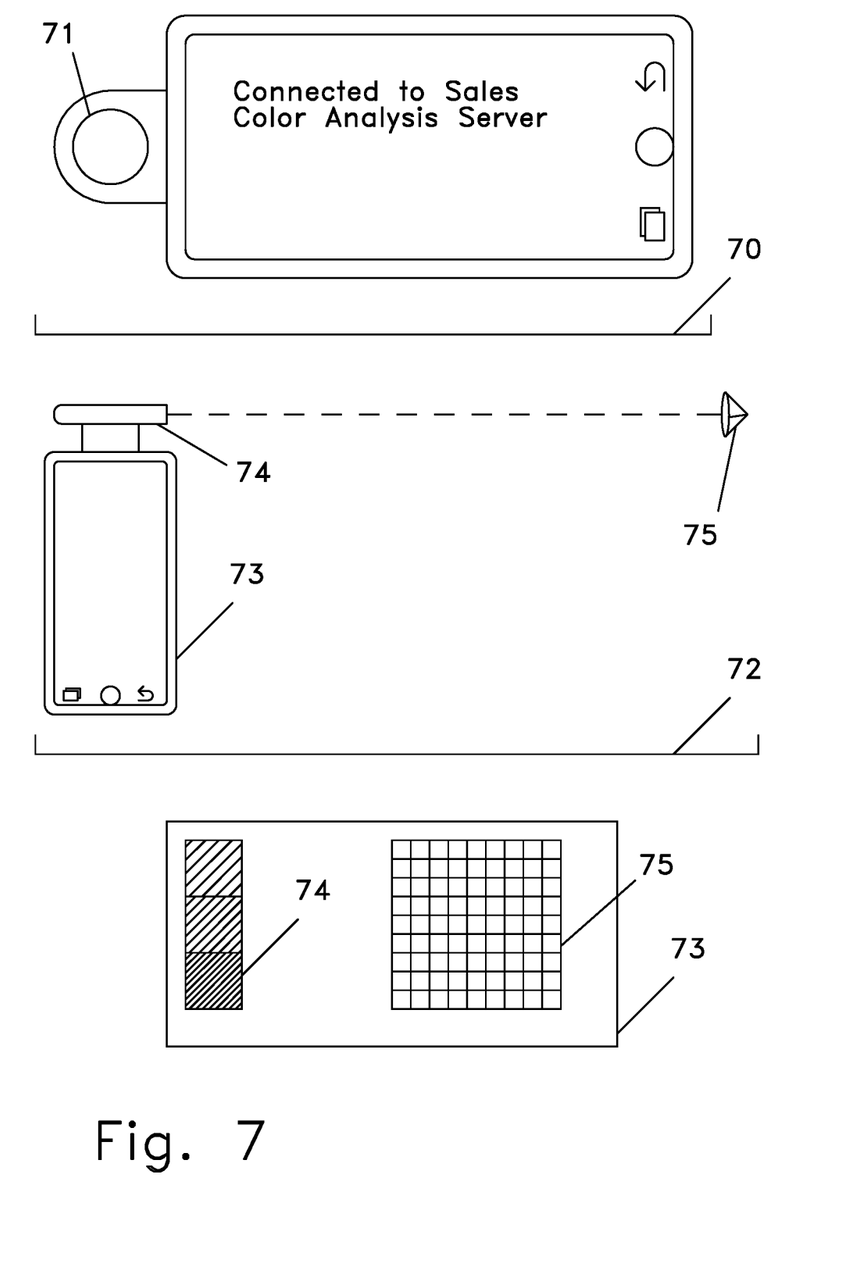
FIG. 7 is a view of additional product definers.

Referring to FIG. 7 additional product definers are depicted. Smart device 70 which is a product definer carries a color sensor 71. The device can either log measurements on its own memory or connect to a sales server. A typical use is to measure the color of items at the customers location to recommend colors for products. If the measurement device is connected to a sales server then the color recommendations can be made on the basis of available stock of products available to the customer.

An additional embodiment 72 has a smart device 73 with has a laser attachment 74 which uses a laser beam to make accurate measurements. In the depicted case the beam is returned by a reflector 75 which has also been supplied as a product definer.

The product definer could be a plaque or target for use with a customers camera, smart device or cellphone. Such a case is shown as 76 which has an area with a precisely printed grid 77. Photographs of the grid could be analyzed to show the range and size of objects photographed with the target. Other areas on the target 78 are printed in controlled colors which allow corrections for accurate color matching of products based on photographs made by the customer.

Figure 8:
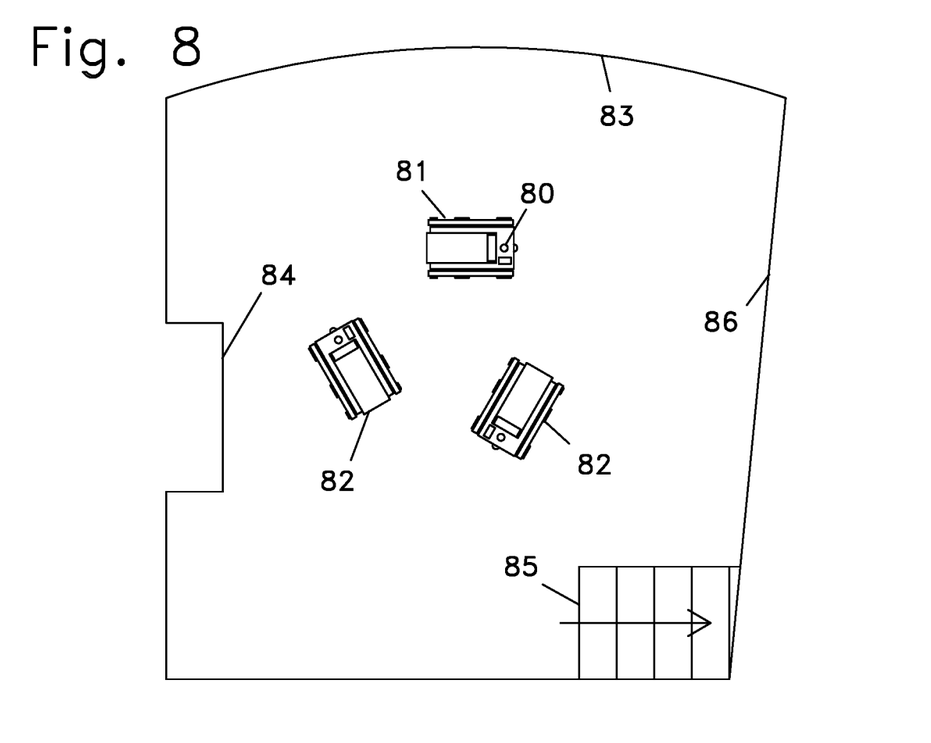
FIG. 8 is a product definer being used to measure a customer's apartment.

Referring to FIG. 8 an application of a product definer is shown implemented as a camera 80 mounted on an autonomous vehicle 81. The autonomous vehicle is also show in two other positions 82. Taking pictures in three or more positions allow a computer which could be on the autonomous vehicle or accessed remotely to generate a three dimensional model of the room and calculate the precise area to be carpeted. The calculated shape for carpet allows for a curved edge 83, notches for a wall projection 84 and stairs 85 and for a wall 86 at a non-perpendicular orientation 86.

Figure 9:
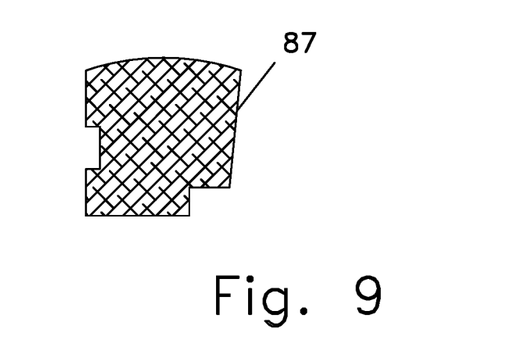
FIG. 9 is the carpeted area as developed by the product definer in FIG. 8

Referring to FIG. 9, the shape 87 calculated by the computer of FIG. 8 is shown. Knowing the precise shape and size of the carpeted area allows the carpet seller to give a price estimate including material and labor. It also allows carpet to be pre-cut to the precise shape needed which would allow installation to be accomplished by personnel with a lower skill requirement. This would be especially useful if the carpet is to have a large pattern element which requires specific placement in the room.

Figure 10:
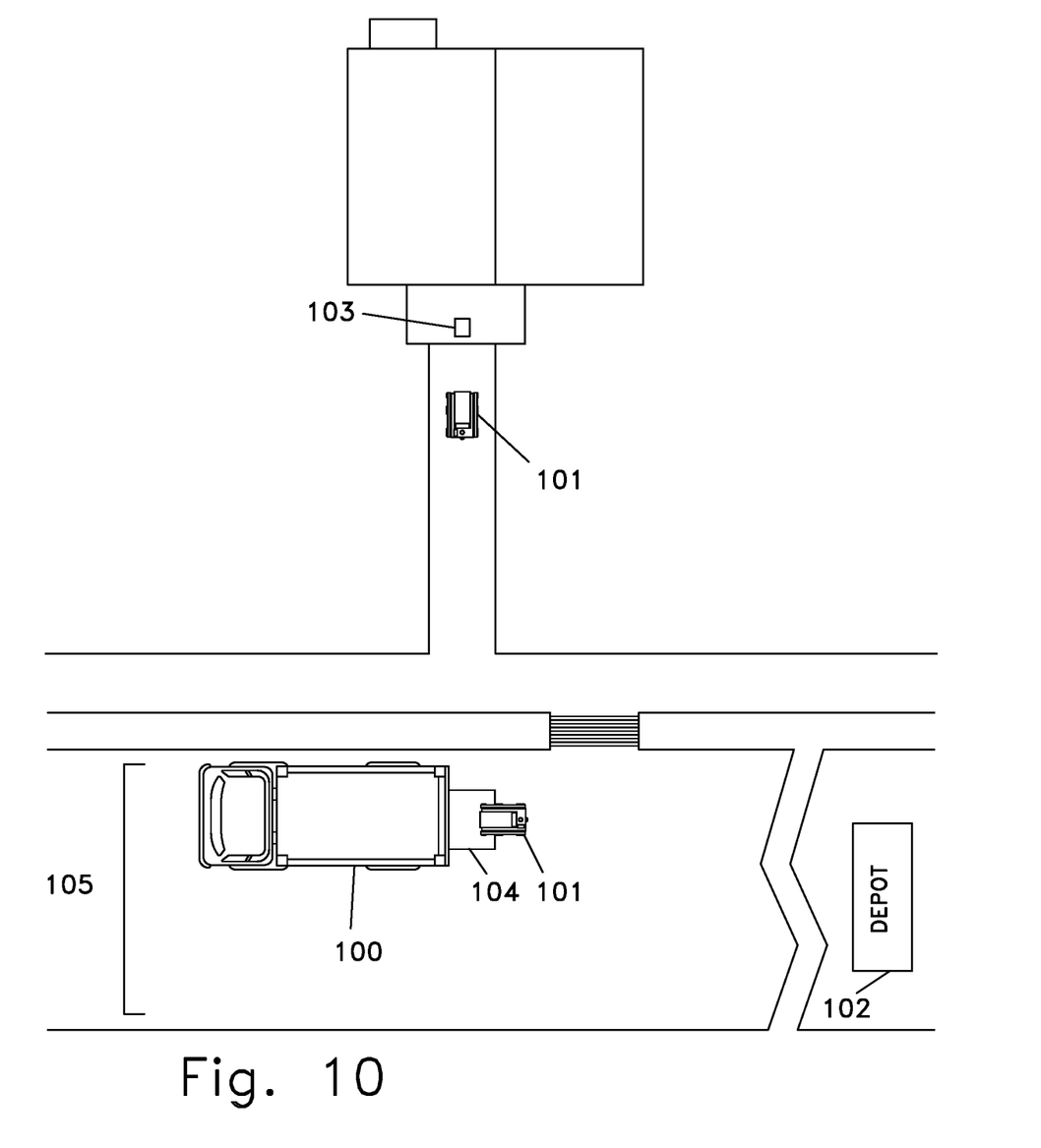
FIG. 10 is a view of a transfer point and certain second vehicle paths.

Referring to FIG. 10, a first vehicle 100 with a cargo of autonomous second vehicles 101 carrying product definers has left a depot 102. A number of first communications have been received from customers and the first vehicle has been scheduled to bring second vehicles to several locations. It drops an autonomous second vehicle 101 at the curb near the presentation location 103 for the first presentation. This location 104 is a transfer point. The product definer may be preloaded on the second vehicle or it may be loaded at the transfer point. For example, if the first vehicle is human driven the driver may be responsible for loading the appropriate product definer. In other cases the selection of the particular second vehicle to use may be the process for selecting an appropriate product definer which is preloaded or installed on the autonomous second vehicle. The second vehicle traverses the distance off of the public road 105 to the presentation point and the presentation is made. In the depicted case the first vehicle may return to pick up the second vehicle after the presentation is complete. The presentation point is depicted as being on the porch of a dwelling, but in many cases the presentation point is inside, especially if the presentation involves measuring or taking pictures to assist in defining the selected product from the class of products.

Figure 11:
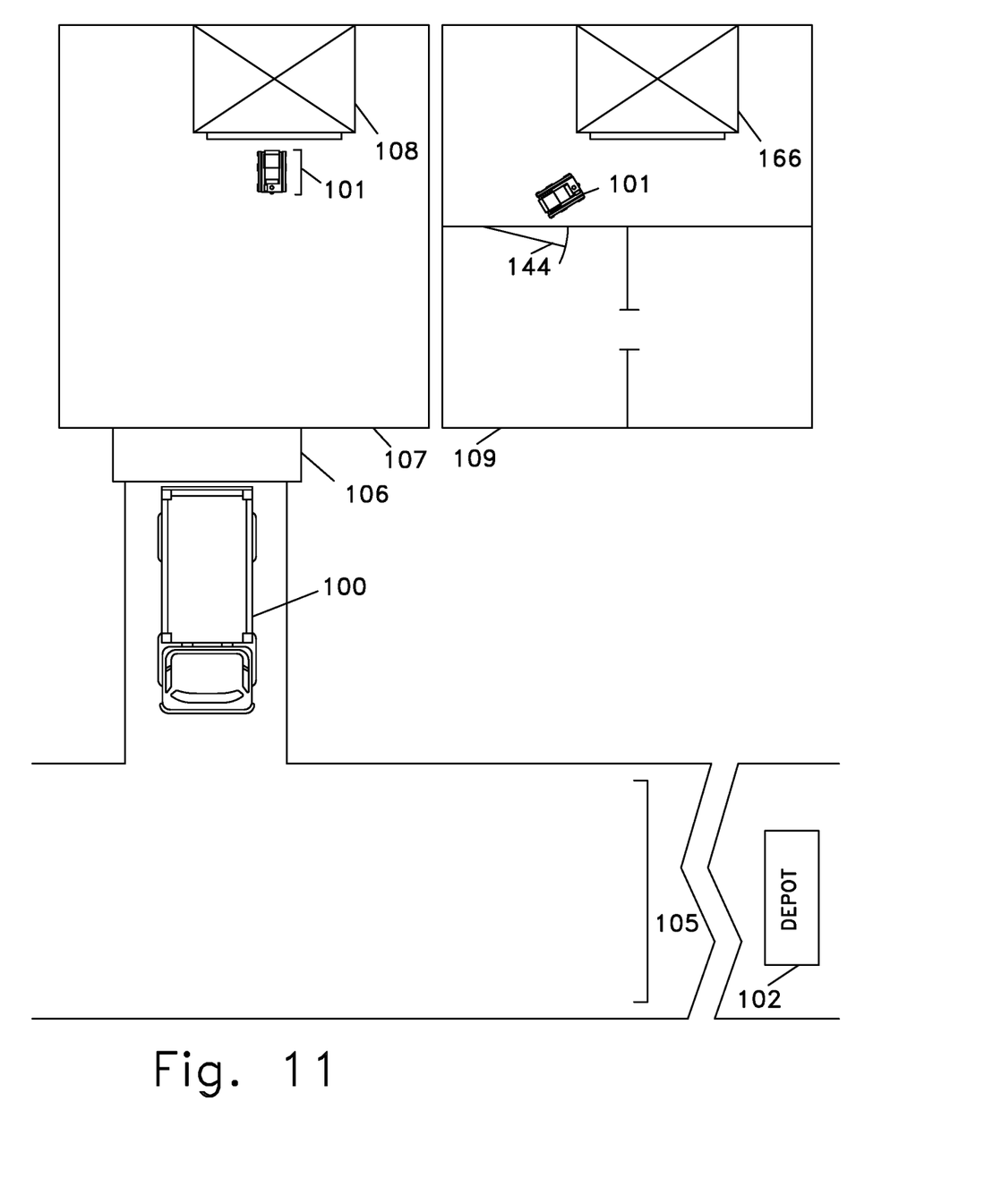
FIG. 11 is a view of a transfer point with second vehicles being dispatched to take an elevator to approach apartment inside doors.

(#'s 100-119) Referring to FIG. 11, a first vehicle 100 with a cargo of autonomous second vehicles 101 carrying product definers has left a depot 102 and traveled by public roads 105 to the loading dock 106 of a multi-story apartment building 107. The loading dock here is a transfer point and a autonomous second vehicle 101 leaves the first vehicle, crosses the loading area and approaches an elevator 108. The second vehicle takes the elevator to the appropriate floor 109 and approaches the appropriate door 110. The buyer lets the vehicle in and the presentation is performed.

I claim:

1. A method of selection a product comprising:
defining a class of products based on a potential demand of a customer,
selecting a location where a physical product definer can acquire information to select a product from the class,
selecting the physical product definer to acquire information to distinguish between products in the class wherein the physical product definer is enabled to acquiring information unsuitable for remote acquisition from at least one of objects and data sources present at the location,
transporting the physical product definer to the location with an autonomous first vehicle, and
selecting a product from the class of products at least partially on the basis of information acquired as a result of use of the physical product definer at the location; wherein:
the selection of the physical product definer is at least partially on the basis of the class of products, and
the physical product definer is transported subsequent to the selection of the physical product definer with at least one of the autonomous first vehicle and a second vehicle distinct from the autonomous first vehicle on a public road network to a point accessible by the public road network and is transported from said point to the location by the autonomous first vehicle.

2. The method of claim 1 wherein:
the information is obtained by measuring an object at the location with the physical product definer.

3. The method of claim 1 wherein:
the information is obtained electronically at the location wherein access to the information is restricted to a limited area including the location.

4. The method of claim 1 wherein:
the information is obtained at the location by a camera comprised in the product definer.

5. The method of claim 1 wherein:
the information is obtained at the location by a sensor comprised in the product definer.

6. The method of claim 1 wherein:
the definition of the class of products is at least partially on the basis of a communication from the customer; and the selection of the location is at least partially on the basis of the communication.

7. The method of claim 6 wherein:
the information is obtained by measuring an object at the location with the physical product definer.

8. The method of claim 6 wherein:
the information is obtained electronically at the location wherein access to the information is restricted to a limited area including the location.

9. The method of claim 6 wherein:
the information is obtained at the location by a camera comprised in the product definer.

10. The method of claim 6 wherein:
the information is obtained at the location by a sensor comprised in the product definer.

* * * * *